US012643481B2

(12) United States Patent (10) Patent No.: US 12,643,481 B2
Hannan et al. (45) Date of Patent: Jun. 2, 2026

(54) MOTOR VEHICLE AND STORAGE SPACE FOR SUCH A MOTOR VEHICLE

(71) Applicant: BOS GmbH & Co. KG, Ostfildern (DE)

(72) Inventors: Mickey Hannan, Shelby Township, MI (US); Amy Wagner, Davisburg, MI (US); Kaivalya Jadhav, Farmington Hills, MI (US)

(73) Assignee: BOS GMBH & CO. KG, Ostfildern (DE)

( * ) Notice: Subject to any disclaimer, the term of this patent is extended or adjusted under 35 U.S.C. 154(b) by 439 days.

(21) Appl. No.: 18/331,415

(22) Filed: Jun. 8, 2023

(65) Prior Publication Data

US 2023/0398939 A1 Dec. 14, 2023

Related U.S. Application Data

(60) Provisional application No. 63/350,625, filed on Jun. 9, 2022.

(51) Int. Cl.
B60R 5/02 (2006.01)
B66F 7/06 (2006.01)

(52) U.S. Cl.
CPC .............. B60R 5/02 (2013.01); B66F 7/065 (2013.01)

(58) Field of Classification Search
CPC ................................. B60R 5/041; B60R 5/042
USPC ........................................ 224/496, 510, 542
See application file for complete search history.

(56) References Cited

U.S. PATENT DOCUMENTS

| | | | | | |
|---|---|---|---|---|---|
| 2,626,179 | A | * | 1/1953 | Gonzalez | B60R 5/041 |
| | | | | | 296/76 |
| 4,455,948 | A | * | 6/1984 | Torres | B60R 5/04 |
| | | | | | 108/138 |
| 4,725,183 | A | * | 2/1988 | Smillie, III | B66F 3/12 |
| | | | | | 187/244 |
| 4,799,849 | A | * | 1/1989 | Miller | B66F 7/02 |
| | | | | | 414/522 |
| 4,887,526 | A | * | 12/1989 | Blatt | B60N 3/001 |
| | | | | | 5/118 |
| 4,941,797 | A | * | 7/1990 | Smillie, III | B66F 3/12 |
| | | | | | 187/269 |
| 4,969,793 | A | * | 11/1990 | Pawl | B62D 43/10 |
| | | | | | 414/641 |
| 5,054,578 | A | * | 10/1991 | Smillie, III | B60R 5/04 |
| | | | | | 187/269 |
| 5,301,992 | A | * | 4/1994 | Whitmore | B60R 5/04 |
| | | | | | 296/26.1 |

(Continued)

FOREIGN PATENT DOCUMENTS

DE 102016100095 A1 7/2016

*Primary Examiner* — Mark C Hageman
(74) *Attorney, Agent, or Firm* — FLYNN THIEL, P.C.

(57) ABSTRACT

Motor vehicle having a storage space embodied as a recess and having a storage space base mounted movably in a lifting manner in the storage space by a lifting device. The storage space base is movable between a lower end position adjacent to a lower end region of the storage space and an upper end position located in the region of an upper-side opening of the storage space. The storage space base has at least one additional functional apparatus positioned on an underside of the storage space base and movable in a lifting manner jointly with a lifting movement of the storage space base.

17 Claims, 4 Drawing Sheets

(56)          References Cited

U.S. PATENT DOCUMENTS

| | | | | |
|---|---|---|---|---|
| 6,145,447 | A * | 11/2000 | Henderson | B60R 5/04 |
| | | | | 108/115 |
| 6,945,580 | B1 * | 9/2005 | Hentes | B60R 9/00 |
| | | | | 224/404 |
| 7,179,040 | B2 * | 2/2007 | Masuda | B66F 7/065 |
| | | | | 414/641 |
| 9,828,222 | B2 * | 11/2017 | Nedelman | B66F 7/065 |
| 10,232,793 | B2 * | 3/2019 | Frederick | B60R 9/06 |
| 11,858,426 | B2 * | 1/2024 | Cho | B60N 3/008 |
| 2006/0102669 | A1 * | 5/2006 | Fouts | B60R 9/00 |
| | | | | 224/404 |
| 2022/0234507 | A1 * | 7/2022 | Kowollik | B60R 7/02 |

* cited by examiner

MOTOR VEHICLE AND STORAGE SPACE FOR SUCH A MOTOR VEHICLE

CROSS-REFERENCE TO RELATED APPLICATION

This claims the benefit of U.S. Provisional Application No. 63/350,625, filed Jun. 9, 2022, the disclosure of which is hereby incorporated by reference in its entirety.

TECHNICAL FIELD

The invention relates to a motor vehicle having a storage space embodied as a recess, and having a storage space base which is mounted movably in a lifting manner in the storage space by means of a lifting device between a lower end position adjacent to a lower end region of the storage space and an upper end position located in the region of an upper-side opening of the storage space. The invention furthermore relates to a storage space for such a motor vehicle, having a storage space base which is mounted movably in a lifting manner in the storage space by means of a lifting device between a lower end position adjacent to a lower end region of the storage space and an upper end position located in the region of an upper-side opening of the storage space.

BACKGROUND AND SUMMARY

DE 10 2016 100 095 A1 discloses a storage space for a utility vehicle which has a height-displaceable storage space base. The storage space base is embodied to be plate-shaped and is displaceable by means of a scissor lift mechanism between a lower end position and an upper end position in the vertical direction. The storage space base is further embodied to be pivotably movable and/or removable with respect to the scissor lift mechanism.

The invention provides a motor vehicle and a storage space of the above-mentioned type which enable further improved use of the storage space in comparison with the prior art.

The above is achieved for the motor vehicle and for the storage space in that the storage space base is assigned at least one additional function apparatus which is positioned on an underside of the storage space base and is movable in a lifting manner jointly with a lifting movement of the storage space base. The storage space base serves to store transport material. As a result of the additional function apparatus, it is possible to assign the storage space base a further function which serves to improve comfort for a user of the motor vehicle.

The lifting device advantageously has a scissor mechanism or a differently configured lifting mechanism which can be actuated by an in particular electrical lifting drive.

In one configuration of the invention, as an additional function apparatus, a horizontal guiding mechanism is fastened to the underside of the storage space base, which horizontal guiding mechanism in the upper end position enables a horizontal displacement of the storage space base beyond the upper-side opening of the storage space. As a result of this, the storage space base can be displaced beyond car body parts or other parts fixed on the vehicle adjoining the storage space in order either to enable further simplified loading or unloading of the storage space base or use the storage space base in a different function, in particular as a storage surface, table surface or support plate.

In a further configuration of the invention, the underside of the storage space base is assigned at least one supporting foot mounted movably between an idle position and a supporting position. The at least one supporting foot is fixed on the underside of the storage space base in its idle position and projects vertically downward in its supporting position in order to be supported on a surface on which the motor vehicle also stands.

In a further configuration of the invention, the at least one supporting foot is embodied to be telescopic. This enables on one hand a space-saving accommodation of the at least one supporting foot in its idle position on the underside of the storage space base. On the other hand, however, in the supporting position, a large height can be bridged by corresponding extension of the supporting foot between the underside of the storage space base and the surface on which the least one supporting foot is supported.

In a further configuration of the invention, the storage space base is constructed from at least two base parts which are foldably movable relative to one another. In its additional function in the horizontally displaced position of the storage space base beyond the upper-side opening of the storage space, the usable storage area of the storage space base can thus be increased in size. In the folded together state, the storage space base can nevertheless be stowed in a compact manner in the storage space. Hinge arrangements which ensure the folding movability of the base parts relative to one another are advantageously provided between the base parts.

In a further configuration of the invention, the storage space base is retained in a pivotably movable manner between a closed position and an open position on a storage compartment frame, which storage compartment frame is height-displaceable by means of the lifting device, and a tub-shaped storage container is retained on the storage compartment frame, the open upper side of which storage container is accessible from above in the open position of the storage space base. The storage compartment frame and the tub-shaped storage container form an additional function apparatus within the meaning of the invention. Small items can be stowed in a hidden and secure manner in the tub-shaped storage container below the storage space base. Since the storage compartment frame and the tub-shaped storage container are height-adjustable jointly with the storage space base, easy accessibility to corresponding items stored in the storage container is enabled when the storage space base is raised up.

In a further configuration of the invention, a manual closure arrangement is provided on the storage space base, by means of which closure arrangement the storage space base can be locked in its closed position relative to the storage compartment frame. The storage space base consequently forms a cover, which can be locked to the storage compartment frame, for the storage container. The closure arrangement can be embodied so as to be capable of being closed off or not being closed off. This means that, in addition to a manually operable locking mechanism, a lock which can be operated by means of a key or a number combination can also be provided.

In a further configuration of the invention, the storage space base is retained in a pivotably movable manner between a closed position and an open position on a carrier frame, and at least one holding receiver is fastened to an underside of the storage space base, which holding receiver serves to fasten or secure a transport material. The holding receiver can be embodied as a net, in the form of clamps, as elastically flexible holders, as a latching arrangement or the like.

In a further configuration of the invention, the storage space is provided in a front region of the motor vehicle. The storage space of the motor vehicle is thus accessible from a front side of the motor vehicle.

Further advantages and features of the invention will become apparent from the claims and from the following description of preferred exemplary embodiments of the invention which are represented on the basis of the drawings.

DETAILED DESCRIPTION

Figure 1:
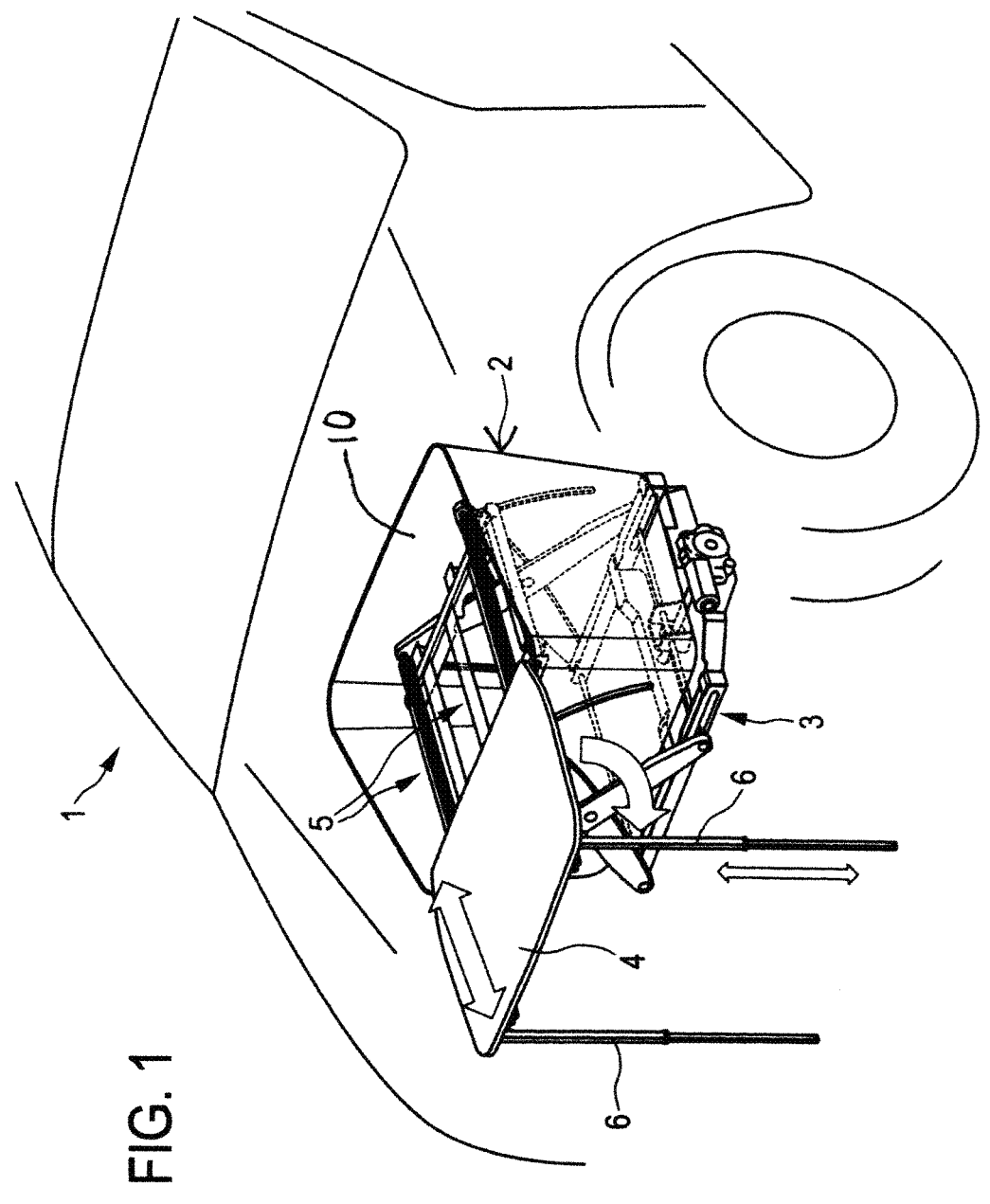
FIG. 1 shows, in a perspective and schematic representation, an embodiment of a motor vehicle according to the invention with an embodiment of a storage space according to the invention in a front region of the motor vehicle.

A passenger car 1 has, according to FIG. 1, in a front region a front hood, not represented in greater detail, under which a storage space 2 is provided. The storage space 2 is open toward the top so that the storage space 2 is accessible from above when the front hood is open. The storage space 2 has a circumferential side wall 10 which delimits the storage space 2 toward the side. The shape and configuration of the circumferential side wall 10 are adapted to adjoining vehicle parts of the front region of the passenger car 1 in a manner which is not represented in greater detail. Toward an underside of the motor vehicle, the storage space 2 has a lower end region in which a lifting device 3 is provided which supports a storage space base 4. The lifting device 3 has in the case of the exemplary embodiment according to FIGS. 1 to 3 a scissor mechanism which enables height displacement of the storage space base 4. The scissor mechanism is driven by an electrical lifting drive which is part of the lifting device. The lifting device 3 thus enables a height displacement of the storage space base 4 in the vertical direction of the vehicle between a lower end position and an upper end position. In the lower end position, the scissor mechanism is compressed largely flat. In the upper end position, the scissor mechanism is positioned in an X-shape. In both end positions, the storage space base 4, which is embodied to be plate-shaped, is oriented in a horizontal plane which is spanned by a transverse direction of the vehicle and a longitudinal direction of the vehicle.

Figure 2:
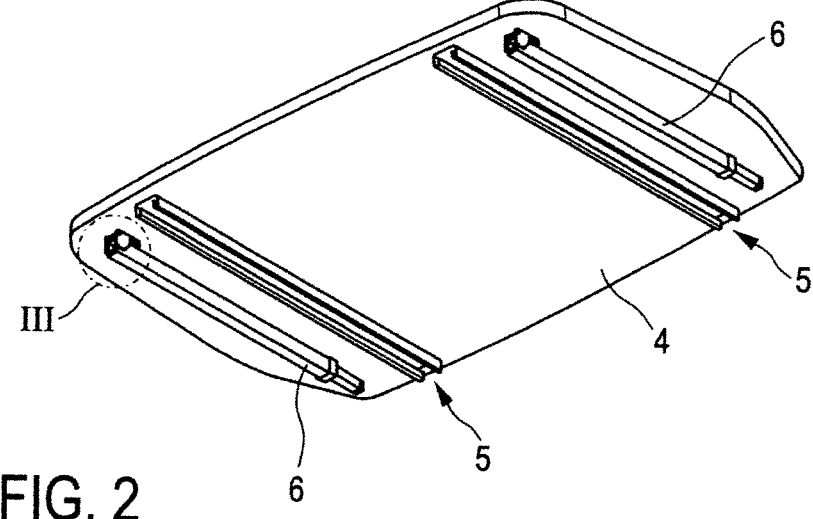
FIG. 2 shows, in an enlarged, perspective representation, a storage space base of the storage space according to FIG. 1 from an underside.
Figure 3:
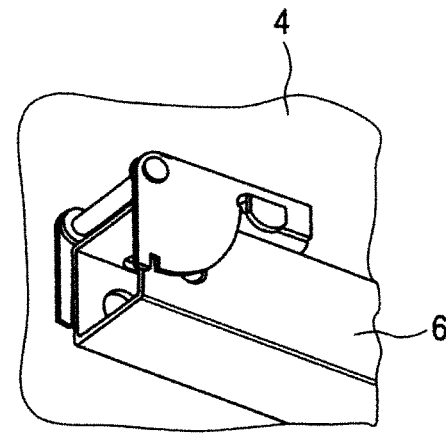
FIG. 3 shows, in an enlarged representation, a cut-out III of the representation according to FIG. 2.

As is clearly apparent on the basis of FIGS. 1 to 3, the storage space base 4 can additionally be moved forward in the longitudinal direction of the vehicle on the scissor mechanism of the lifting device by means of a horizontal guiding mechanism 5, starting from a starting position in which the storage space base 4 is surrounded by the side wall 10 of the storage space 2. The lifting device 3 including its scissor mechanism is configured in such a manner that the storage space 4 in the upper end position is positioned relative to upper edges of the circumferential side wall 10 of the storage space 2 so that, in the case of a movement of the storage space base 4 by means of the horizontal guiding mechanism 5 horizontally forward, the storage space base 4 can be moved beyond the front upper edge of the circumferential side wall 10 of the storage space 2. The front edge of the circumferential side wall 10 of the storage space 2 is part of a circumferential edge of the storage space 2 which borders the upper-side opening of the storage space 2. The front edge of the circumferential edge of the upper-side opening of the storage space 2 is, in the case of the represented exemplary embodiment, lower in the vertical direction of the vehicle than a rear-side edge of the circumferential edge of the upper-side opening of the storage space 2.

The horizontal guiding mechanism 5 is configured as a drawer-like guide rail system which engages on the underside of the storage space base 4. Two supporting feet 6 which are spaced apart from one another and which are oriented parallel to one another are furthermore arranged on the underside of the storage space base 4. The two supporting feet 6 are telescopically extendable in their vertically downwardly projecting supporting position and can also be locked in this extended supporting position. Both supporting feet 6 are displaceable by means of a pivot hinge, which is apparent on the basis of FIG. 3, pivotably movably between an idle position and the supporting position by approximately 90°. The pivot hinges are fastened to an underside of the storage space base 4. Each supporting foot 6 is locked in its idle position which bears against the underside of the storage space base 4. The locking can be released manually, as a result of which the respective supporting foot 6 is pivoted downward by 90°. In the supporting position projecting downward vertically from the storage space base 4, the corresponding pivot position of the respective supporting foot 6 can also be locked relative to the storage space base 4 in order to avoid an unintentional pivoting in of the supporting feet 6. The then extended telescopic position of the supporting feet 6 according to FIG. 1 can also be locked so that corresponding telescopic tube parts of the supporting feet 6 cannot unintentionally be pushed together in the case of pressure from above on the storage space base 4. The corresponding locking can be released manually both for the telescoping capacity of the supporting feet 6 and for the downwardly pivoted supporting position and for the idle position which bears against the underside of the storage space base 4.

If the storage space base 4 according to FIG. 1 is moved forward over the upper-side opening of the storage space 2 and is supported downward by the supporting feet 6, the upper side of the storage space base 4 can be used as a table surface. Starting from this table function, the supporting feet 6 can be pushed together telescopically and pivoted into their idle position on the underside of the storage space base 4 and locked there. The storage space base 4 is subsequently pushed back to the rear until the storage space base 4 is once again flush with the storage space 2 in the vertical direction. The storage space base 4 can finally be moved downward by means of the lifting device 3.

Figure 4:
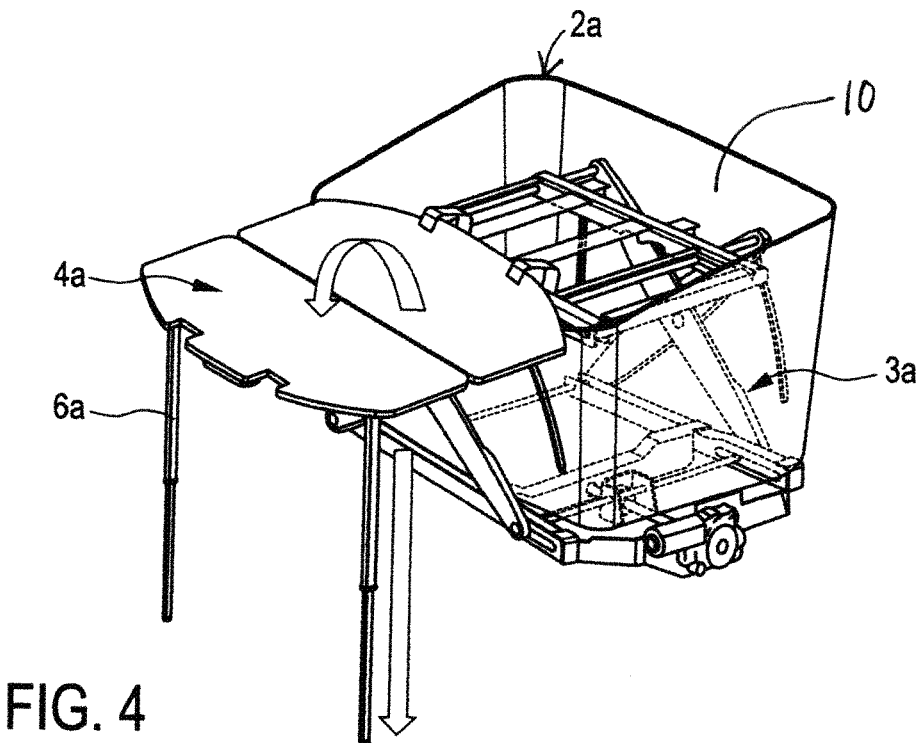
FIG. 4 shows a further embodiment of a storage space according to the invention for a motor vehicle according to FIG. 1, wherein the storage space is configured similarly to FIG. 1.

The embodiment according to FIG. 4 corresponds largely to the embodiment described on the basis of FIGS. 1 to 3. Structurally identical or functionally identical portions or parts are provided with identical reference numbers with the addition of the letter a. In order to avoid repetition, reference is additionally made to the statements in relation to the embodiment according to FIGS. 1 to 3. The differences are discussed below in relation to FIG. 4.

The significant difference in the case of the embodiment according to FIG. 4 is that the storage space base 4a is divided in two along a separating line extended in the transverse direction of the vehicle. As a result of this, two plate parts, also referred to as base parts, are formed for the plate-shaped storage space base 4a, which plate parts are positioned behind one another in the longitudinal direction of the vehicle. The two plate parts are connected to one another in a pivotably or foldably movable manner relative to one another via a hinge arrangement. In a folded together storage position, the two plate parts lie on one another with their upper sides. The two plate parts of the storage space base 4a have approximately identical outer dimensions so that the two plate parts are flush with one another in the folded together idle position with their outer edges in the vertical direction. The outer dimensions of each plate part are matched to a clearance within the storage space 2a in such a manner that the plate parts in the folded together state at least largely adjoin the circumferential side wall 10 of the storage space 2a with their outer edges.

The storage space base 4a is also provided with two supporting feet 6a which are arranged on the front plate part in the folded out state. In contrast to the embodiment according to FIGS. 1 to 3, the likewise telescopic supporting feet 6a cannot be pivoted in the longitudinal direction of the vehicle to the rear in the direction of their idle position, but rather in opposite directions to one another in the transverse direction of the vehicle. In their idle position which is folded upward and pushed together telescopically, the two supporting feet 6a thus only bear against the underside of the front plate part. In the folded together state of the plate parts, the supporting feet 6a can thus be seen from above.

The storage space base 4a is also provided in an identical manner to the embodiment according to FIGS. 1 to 3 with a horizontal guiding mechanism in order to displace the storage space base 4a forward in the upper end position of the lifting device 3a beyond the front edge of the upper-side opening of the storage space 2a. In the folded together state of the two plate parts of the storage space base 4a, the storage space base 4a can be lowered into the lower end position by means of the lifting device 3a once the storage space base 4a has been pushed back by means of the horizontal guiding mechanism into its flush position in the vertical direction on the scissor mechanism of the lifting device 3a. The horizontal guiding mechanism engages in the case of the embodiment according to FIG. 4 only on the rear plate part of the storage space base 4a, there on its underside. They are configured in an identical manner to the horizontal guiding mechanism 5 according to FIGS. 1 to 3.

The horizontal guiding mechanism 5, the supporting feet 6 and 6a and the foldable storage space base 4a according to FIG. 4 form additional function devices within the meaning of the invention.

Figure 5:
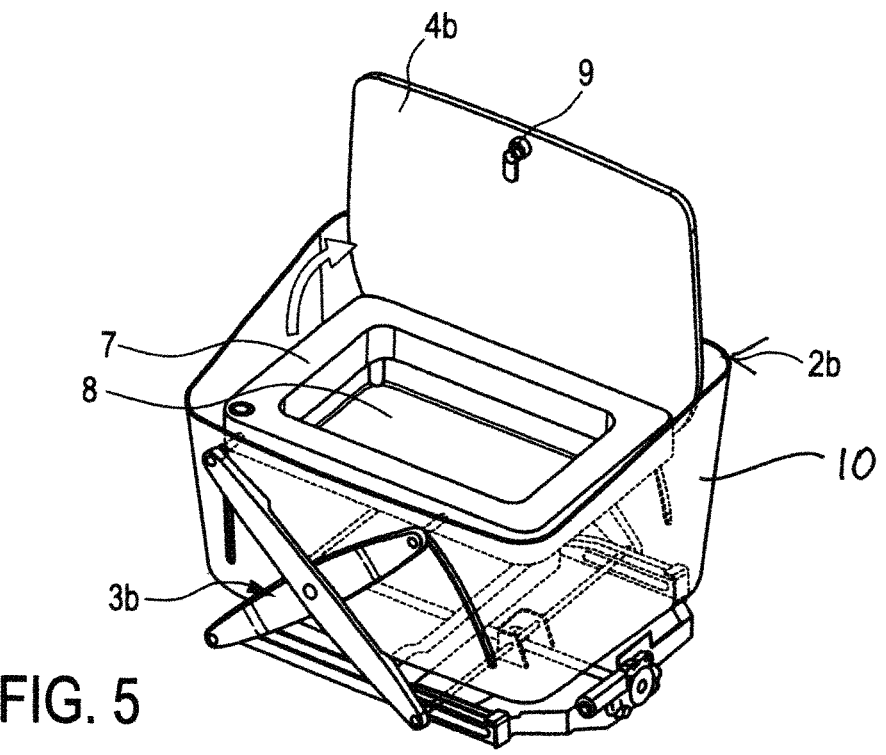
FIG. 5 shows a further embodiment of a storage space according to the invention in a schematic, perspective representation.

A storage space 2b according to FIG. 5 is provided in an identical manner in a front region of a passenger car, as is the case according to FIG. 1. The storage space 2b has in an analogous manner to the storage space 2 according to FIG. 1 a circumferential side wall 10. A lifting device 3b which has a lifting drive as well as a scissor mechanism in an analogous manner to the embodiment according to FIG. 1 is provided in a lower end region of the storage space 2b. Identical or functionally identical parts and portions are consequently provided with identical reference numbers with the addition of the letter b. In order to avoid repetition, reference is made additionally to the embodiment according to FIGS. 1 to 3.

The significant differences in the case of the embodiment according to FIG. 5 are that on one hand the storage space base 4b is supported by a storage compartment frame 7 which in turn is height-displaceable by means of the lifting device 3b. On the other hand, the storage space base 4b is mounted in a pivotably movable manner on the storage compartment frame 7 in the arrow direction according to FIG. 5 between a horizontal position which lies on the storage compartment frame 7 and a vertical position pivoted to the rear or upward.

A tub-shaped storage container 8 is fastened to the storage compartment frame 7 below the storage compartment frame 7. The storage compartment frame 7 circumferentially surrounds an opening which is simultaneously also the opening of the tub-shaped storage container 8. The storage space base 4b serves as a pivotably movable cover for closing the opening of the storage compartment frame 7 and of the storage container 8. The storage space base 4b can be locked in its horizontal position, in which the storage space base 4b covers and closes off an upper side of the storage compartment frame 7 and of the storage container 8, by means of a manually operable mechanical closure arrangement 9 on the storage compartment frame 7. The closure arrangement 9 can additionally be assigned a lock which locks an operation of the closure arrangement so that the closure arrangement can be embodied so as to be capable of being closed. The closure arrangement can be locked in a positive manner with the storage compartment frame or can be unlocked relative to the storage compartment frame 7.

Figure 6:
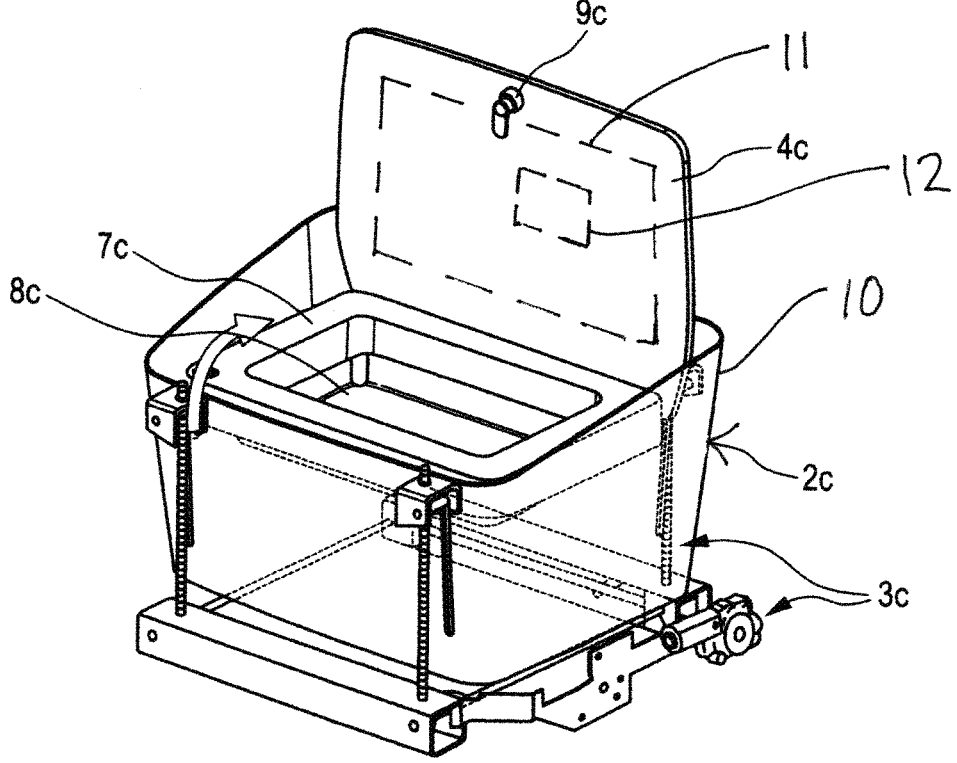
FIG. 6 shows a further embodiment of a storage space according to the invention similar to FIG. 5.

The embodiment according to FIG. 6 corresponds substantially to the embodiment according to FIG. 5 so that, in order to avoid repetition, reference is additionally made to the drawings and the description in relation to the embodiment according to FIG. 5. Functionally identical parts and portions of the embodiment according to FIG. 6 are provided with identical reference numbers with the addition of the letter c. A significant difference in the case of the embodiment according to FIG. 6 is that the lifting device 3c has, instead of a scissor mechanism, a spindle drive having several threaded spindles oriented parallel to one another in the vertical direction of the vehicle. The storage compartment frame 7c is coupled to the threaded spindles via threaded nuts, not described in greater detail. The lifting drive of the lifting device 3c drives the threaded spindles, as a result of which the storage compartment frame 7c can be height-displaced by corresponding actuation of the lifting drive in the vertical direction of the vehicle by corresponding screwing up or screwing down.

In the case of an exemplary embodiment, of the invention, a storage space base similar to the embodiments according to FIGS. 5 and 6 is mounted in a pivotably movable manner on a carrier frame which can in turn be height-displaced in the vertical direction of the vehicle by means of a lifting device provided with a lifting drive. At least one holding receiver is fastened to an underside of the storage space base. In the case of one embodiment, the holding receiver is embodied as an elastic, rectangular net 11 (shown diagrammatically in dotted lines in FIG. 6) which is fixed to the underside of the storage space base with its corner regions and serves to secure transport items placed in the net. Alternatively, other holding receivers such as latching or plug-in receivers 12 (shown diagrammatically in dotted lines in FIG. 6) can also be fitted on the underside of the storage space base, on which tools or other transport items can be secured in a manually detachable manner.

The invention claimed is:

1. A motor vehicle comprising a storage area and a storage space configured for installation in the storage area, the storage space comprising a substantially upright storage space side wall, a lower region and an upper region spaced upwardly from the lower region, the storage space side wall having an upper edge defining an upper extent of the upper region of the storage space, the storage space further comprising a storage space base oriented transversely relative to the storage space side wall and being substantially surrounded by the storage space side wall, the storage space further comprising a lifting device, the storage space base being mounted for movement relative to the storage space side wall by the lifting device between a lower end position and an upper end position, the storage space base and the storage space side wall in the lower end position of the storage space base together defining a recess opening upwardly through the upper edge of the storage space side wall, the storage space base in the lower end position defining a lower extent of the recess and forming a bottom of the storage space for supporting at least one object located within the storage space as a first function, the storage space base in the upper end position being disposed vertically adjacent the upper edge of the storage space side wall, the storage space base having an underside, and the storage space further comprises an apparatus fixed to the underside of the storage space base for movement therewith between the lower end position and the upper end position, the apparatus being configured to provide the storage space base with a second function different from the first function.

2. The motor vehicle according to claim 1 wherein the apparatus comprises a guiding mechanism fixed to the underside of the storage space base, the guiding mechanism permitting horizontal displacement of the storage space base sidewardly horizontally beyond the upper edge of the storage space side wall into a sideward position to permit use of the storage space base as a table.

3. The motor vehicle according to claim 2, wherein the apparatus further comprises at least one support foot movably mounted to the underside of the storage space base for movement between an idle position and a supporting position, the at least one support foot in the supporting position projecting downwardly from the storage space base to support the storage space base on a surface on which the motor vehicle is supported.

4. The motor vehicle according to claim 3, wherein the at least one support foot has a telescopic configuration.

5. The motor vehicle according to claim 1, wherein the storage space base comprises at least two base parts hingedly connected to one another for movement between a folded storage position and an unfolded use position, the at least two base parts in the folded storage position being disposed in superimposed relation with one another and in the unfolded use position being disposed in side-by-side relation with one another and together defining an upwardly facing support surface.

6. The motor vehicle according to claim 1, wherein the apparatus comprises a storage compartment frame and a tub-shaped storage container having an open upper side and being fixed to the storage compartment frame, the storage space base being mounted in a pivotally movable manner on the storage compartment frame for movement relative thereto between a closed position and an open position, the storage compartment frame being mounted on the storage space base for movement therewith between the upper end position and the lower end position and the open upper side of the storage container is accessible from above in the open position of the storage space base.

7. The motor vehicle according to claim 6, wherein the apparatus comprises a manual closure arrangement disposed on the storage space base and being lockable in the closed position relative to the storage compartment frame by the manual closure arrangement.

8. The motor vehicle according to claim 1, wherein the apparatus comprises a frame and the storage space base is mounted in a movable manner on the frame for movement relative thereto between a closed position and an open position, and the apparatus further comprises a cargo securing or fastening device fixed to the underside of the storage space base.

9. The motor vehicle according to claim 1, wherein the storage area of the motor vehicle comprises a front region and the storage space is disposed in the front end region.

10. A storage space for use in a storage area of a motor vehicle, the storage space comprising a substantially upright storage space side wall, a lower region and an upper region spaced upwardly from the lower region, the storage space side wall having an upper edge defining an upper extent of the upper region of the storage space, the storage space further comprising a storage space base oriented transversely relative to the storage space side wall and being substantially surrounded by the storage space side wall, the storage space further comprising a lifting device, the storage space base being mounted for movement relative to the storage space side wall by the lifting device between a lower end position and an upper end position, the storage space base and the storage space side wall in the lower end position of the storage space base together defining a recess opening upwardly through the upper edge of the storage space side wall, the storage space base in the lower end position defining a lower extent of the recess and forming a bottom of the storage space for supporting at least one object located within the storage space as a first function, the storage space base in the upper end position being disposed vertically adjacent the upper edge of the storage space side wall, the storage space base having an underside, and the storage space further comprises an apparatus fixed to the underside of the storage space base for movement therewith between the lower end position and the upper end position, the apparatus being configured to provide the storage space base with a second function different from the first function.

11. The storage space according to claim 10, wherein the apparatus comprises a guiding mechanism fixed to the underside of the storage space base, the guiding mechanism permitting horizontal displacement of the storage space base sidewardly horizontally beyond the upper edge of the storage space side wall into a sideward position to permit use of the storage space base as a table.

12. The storage space according to claim 11, wherein the apparatus further comprises at least one support foot movably mounted to the underside of the storage space base for movement between an idle position and a supporting position, the at least one support foot in the supporting position projecting downwardly from the storage space base to support the storage space base on a surface on which the motor vehicle is supported.

13. The storage space according to claim 12, wherein the at least one support foot has a telescopic configuration.

14. The storage space according to claim 10, wherein storage space base comprises at least two base parts hingedly connected to one another for movement between a folded storage position and an unfolded use position, the at least two base parts in the folded storage position being disposed in superimposed relation with one another and in the unfolded use position being disposed in side-by-side relation with one another and together defining an upwardly facing support surface.

15. The storage space according to claim 10, wherein the apparatus comprises a storage compartment frame and a tub-shaped storage container having an open upper side and being fixed to the storage compartment frame, the storage space base being mounted in a pivotably movable manner on the storage compartment frame for movement relative thereto between a closed position and an open position, the storage compartment frame being mounted on the storage space base for movement therewith between the upper end position and the lower end position and the open upper side of the storage container is accessible from above in the open position of the storage space base.

16. The storage space according to claim 15, wherein the apparatus comprises a manual closure arrangement disposed on the storage space base and being lockable in the closed position relative to the storage compartment frame by the manual closure arrangement.

17. The storage space according to claim 10, wherein the apparatus comprises a frame and the storage space base is mounted in a movable manner on the frame for movement relative thereto between a closed position and an open position, and the apparatus further comprises a cargo securing or fastening device fixed to the underside of the storage space base.

\* \* \* \* \*